United States Patent [19]

Nishikawa et al.

[11] 4,315,145
[45] Feb. 9, 1982

[54] MAGNETIC RECORDING STRUCTURE

[75] Inventors: Seiichi Nishikawa, Koganei; Makoto Honda, Kamifukuoka, both of Japan

[73] Assignee: Dai Nippon Insatsu Kabushiki Kaisha, Tokyo, Japan

[21] Appl. No.: 141,489

[22] Filed: Apr. 18, 1980

Related U.S. Application Data

[63] Continuation of Ser. No. 832,738, Sep. 12, 1977, abandoned.

[30] Foreign Application Priority Data

Sep. 14, 1976 [JP] Japan .................. 51-122944
Sep. 14, 1976 [JP] Japan .................. 51-122945

[51] Int. Cl.³ .................................. G06K 19/00
[52] U.S. Cl. .................................. 235/493; 428/900; 360/2
[58] Field of Search ............ 360/131, 134, 135, 136, 360/1, 2; 346/135, 1, 136, 137, 138; 428/900, 539, 336, 694, 425.8, 425.9, 458, 459, 467; 427/127–132; 156/235, 239, 247, 249

[56] References Cited

U.S. PATENT DOCUMENTS

| | | | |
|---|---|---|---|
| 3,417,389 | 12/1968 | Dike | 360/131 |
| 3,497,411 | 2/1970 | Chebiniak | 427/131 |
| 3,516,860 | 6/1970 | Simmons | 427/131 |
| 3,644,716 | 2/1972 | Nagata et al. | 360/131 |
| 3,721,613 | 3/1973 | Wilhelm et al. | 360/131 |
| 3,755,730 | 8/1973 | Vogelgesang | 427/132 |
| 3,838,252 | 9/1974 | Hynes et al. | 360/2 |
| 3,922,430 | 11/1975 | Mayer | 428/900 |
| 4,090,662 | 5/1978 | Fayling | 360/2 |
| 4,124,736 | 11/1978 | Patel et al. | 428/900 |
| 4,132,350 | 1/1979 | Kubota et al. | 235/493 |
| 4,152,476 | 5/1979 | Stillman | 360/2 |

FOREIGN PATENT DOCUMENTS

| | | | |
|---|---|---|---|
| 2221493 | 11/1972 | Fed. Rep. of Germany | 235/493 |
| 2423819 | 12/1974 | Fed. Rep. of Germany | 427/131 |
| 51-75403 | 6/1976 | Japan | 428/900 |
| 52-14603 | 4/1977 | Japan | 427/131 |

Primary Examiner—Stanley S. Silverman
Attorney, Agent, or Firm—Kenyon & Kenyon

[57] ABSTRACT

A magnetic recording structure comprises (1) a substrate having an outer surface, and (2) a laminar magnetic recording piece disposed adjacent to at least one part of the outer surface of the substrate, the recording piece comprising a magnetic layer, a color layer and a non-magnetic metal deposition layer interposed between the magnetic layer and the color layer, the magnetic layer being closer to the substrate than the color layer.

The non-magnetic metal deposition layer disposed on the magnetic layer has high hiding power and, even in the form of an extremely thin layer, can effectively hide the color of the magnetic material.

Accordingly, this magnetic recording structure can be produced with a surface of a beautiful color without impairing its magnetic characteristics.

13 Claims, 13 Drawing Figures

MAGNETIC RECORDING STRUCTURE

This is a continuation of application Ser. No. 832,738 filed on Sept. 12, 1977 now abandoned.

BACKGROUND OF THE INVENTION

The present invention relates to a colored magnetic recording structure.

Magnetic bankbooks, ledgers, cards or the like having a magnetic recording region provided by bonding of transferring magnetic recording pieces, for example, in strips, onto a part of the bankbook, ledger, or card such as an identification card are widely used.

In recent years, a color layer is disposed on a magnetic layer in the magnetic recording piece to hide the color of the magnetic material and impart a desired color to the recording piece thereby to obtain a so-called colored magnetic recording piece and further to obtain a colored magnetic recording structure.

However, this type of colored magnetic recording piece has a drawback in that the color layer provided thereon cannot completely hide the brown or dark-brown color of the magnetic layer unless the thickness thereof exceeds about 10 μm.

However, the magnetic output among the electromagnetic conversion characteristics depends on the gap between a magnetic head and a magnetic layer, and, the larger the gap, the lower will the magnetic output be. More particularly, the gap loss is increased by another layer disposed on the surface of the magnetic layer, and the thicker the layer thus disposed and the higher the magnetic recording density, the lower will the magnetic output be. Thus, the thicker the color layer in the colored magnetic strip, the lower will the magnetic recording performance be. Heretofore, conventional magnetic recording structures either could not be made with beautiful colors because the color of the magnetic material could not be completely hidden, or else the magnetic characteristics of the structures were sacrificed to obtain beautiful colors.

SUMMARY OF THE INVENTION

An object of the present invention is to provide a beautiful colored magnetic recording structure wherein the color of the magnetic material is completely hidden while the magnetic characteristics are satisfactorily retained.

Another object of the present invention is to provide a process for producing a colored magnetic recording structure of the above stated character.

We have found that, by disposing a non-magnetic metal deposition layer on a layer of magnetic material and further disposing a color layer on the non-magnetic metal deposition layer, it is possible to effectively hide the color of the magnetic material with an extremely thin metal layer obtained by vacuum deposition and to produce a magnetic recording structure of beautiful colors without increasing the thickness of the color layer and thus without reducing the magnetic characteristics of the structure.

The magnetic recording structure according to the present invention comprises (1) a substrate having an outer surface, and (2) a laminar magnetic recording piece disposed adjacent to at least one part of the outer surface of the substrate, the recording piece comprising a magnetic layer, a color layer and a non-magnetic metal deposition layer interposed between the magnetic layer and the color layer, the magnetic layer being closer to the substrate than the color layer.

The above-stated magnetic recording structure is produced, for example, by the following processes which are different from each other in the order of formation of the respective layers.

A first process comprises disposing successively in laminated state on a planar support a color layer, a non-magnetic metal deposition layer, and a magnetic layer, bonding the magnetic layer to a substrate, and peeling off the support from the structure thus obtained.

A second process comprises disposing successively in laminated state on one surface of a planar support a magnetic layer, a non-magnetic metal deposition layer, and a color layer, to prepare a laminar magnetic recording piece, providing on the other surface of the support an adhesive layer, and bonding the magnetic recording piece onto a desired portion of a substrate by means of the adhesive layer.

A third process comprises disposing a magnetic layer adjacent to at least one part of a substrate to obtain a first structure, disposing successively in laminated state a color layer and a non-magnetic metal deposition layer on one surface of a planar support to obtain a second structure, and bonding the non-magnetic metal deposition layer of the second structure onto the surface of the first structure having the magnetic layer, and peeling off the planar support from the structure thus obtained.

The nature, principle, and utility of the present invention will be more clearly understood from the following detailed description when read in conjunction with the accompanying drawings, wherein like parts are designated by like reference numerals.

DETAILED DESCRIPTION

Figure 1:
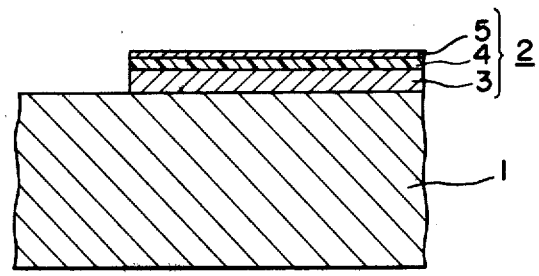
FIGS. 1, 3, 5 and 7 through 12 are greatly magnified, fragmentary sectional views respectively of examples of the magnetic recording structure according to the present invention.
Figure 12:
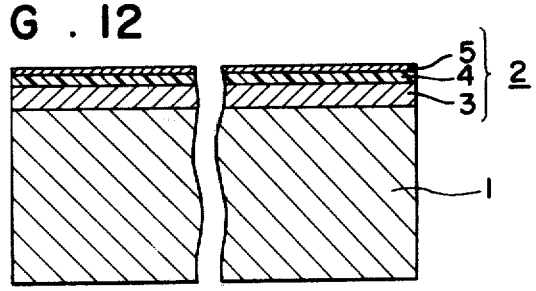

FIG. 1 shows an example of the magnetic recording structure according to the present invention obtained by securing adjacent to any part of a surface of a substrate 1 a laminar magnetic recording piece 2 comprising a magnetic layer 3, a non-magnetic metal deposition layer 4, and a color layer 5. FIG. 12 shows another example of the magnetic recording structure according to the present invention wherein a laminar magnetic recording piece 2 comprising a magnetic layer 3, non-magnetic metal deposition layer 4 and a color layer 5 is secured on an entire surface of a substrate 1.

The substrate 1 is selected from materials in any form having at least one surface, and ordinarily from papers or plastic or non-magnetic meal sheets constituting magnetic cards, bankbooks, ledgers or the like.

The magnetic layer 3 is obtained, for example, by providing, by the roller coating method, a magnetic paint comprising a binder containing as a principal constituent any natural or synthetic resin such as a vinyl chloride/vinyl acetate copolymer or a vinyl chloride/vinylidene chloride copolymer, and a magnetic material such as magnetic iron oxide including $\gamma$-$FE_2O_3$ and $Fe_3O_4$, chromium oxide or Fe-Co-Ni alloys in powder form, dissolved or dispersed together in a liquid medium. The thickness of the magnetic layer thus made ranges for example, from about 5 to 20 μm.

The magnetic layer 3 may also be obtained by application of a magnetic film comprising a binder containing a magnetic material powder dispersed therein.

The non-magnetic metal deposition layer 4 is formed to a thickness of from 0.02 to 0.1μm, preferably from 0.03 to 0.08 μm, e.g., about 0.05 μm, by vacuum deposition of any non-magnetic metal. Preferred examples of metals are Al, Sn, Au and Ag from the point of view of facility of vacuum deposition, economy and hiding power.

The vacuum deposition includes vacuum evaporation deposition, sputtering, ion plating and any other method comprizing vaper-phase transfer of metal particles under a reduced pressure to produce a thin metal coating film. Temperature and pressure conditions of the vacuum deposition are not different from those known for each non-magnetic metal. For example, a temperature of 1200° to 1300° C. and a pressure of $10^{-4}$ torr may be used for Al.

The color layer 5 is obtained as a print layer, for example, by providing, by the roller coating or gravure coating method, a color ink comprising a pigment or dye of a desired hue and a binder principally composed of any natural or synthetic resin such as a polyamide resin, a cellulose resin, melamine resin, a vinyl chloride/vinyl acetate copolymer, a polyurethane resin, an acrylic resin or a maleic acid resin, either dissolved or dispersed in a liquid medium.

Since the color of the magnetic layer 3 is completely hidden by the non-magnetic metal deposition layer 4, a color layer of a thickness of only 1 to 2 μm is sufficient to produce any beautiful color.

The color layer 5 can provide not only a uniform color over the entire surface of the magnetic recording piece 2 but also multicolored patterns.

Further, the color layer 5 per se can have a laminar structure comprising a plurality of color layers, which can result in multicolored patterns.

In the magnetic recording structure of the present invention described above, the magnetic layer 3, the non-magnetic metal deposition layer 4 and the color layer 5 may be successively disposed in the order named by coating or vacuum deposition on the substrate 1 to form the magnetic recording piece 2 on the substrate.

However, a substrate constituting a magnetic bankbook, ledger, or card must support a magnetic recording piece and, in addition, have necessary visible information printed thereon.

It is thus preferable that the magnetic recording piece 2 per se be substantially completed independently of the substrate 1 and then secured in a desired portion of the substrate 1. This is also preferable from the point of view of mass production.

In order to achieve this object, any of the three processes set forth hereinbelow by way of examples may be advantageously employed.

Figure 2:
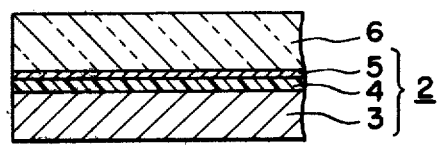
FIGS. 2, 4, 6(a), and 6(b) are similar sectional views respectively showing intermediate stages in a process for producing the magnetic recording structure according to the present invention.

According to a first process, the color layer 5, the non-magnetic metal deposition layer 4 and the magnetic layer 3 are disposed by coating or vacuum deposition on one surface of a planar support 6 made, for example, of a plastic sheet or a metal sheet having a thickness of about 10–50 μm to obtain the structure shown in FIG. 2. Subsequently, the magnetic layer 3 is contacted with a desired portion of the substrate 1, compressed with a pressure of about 10 to 100 kg/cm² applied from the side of the planar support 6, and maintained at a temperature of from 100° to 200° C., whereby a thermoplastic resin, such as a vinyl chloride/vinyl acetate copolymer resin, used in the magnetic layer 3 as a binder is softened or melted, and the structure shown in FIG. 2 is secured on the substrate 1. The compression is effected by a roll-press instantaneously, or by a flat-plate press for a period of, e.g., several seconds to 30 minutes. Then, by peeling off the planar support 6, the magnetic recording structure of the present invention illustrated in FIG. 1 is obtained.

Figure 3:
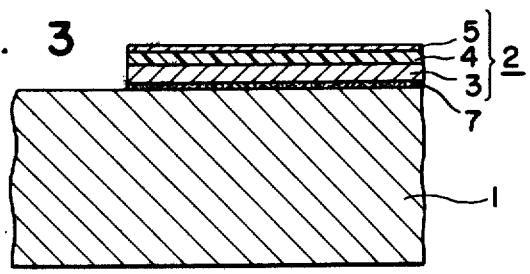

The process set forth above in connection with the application of the structure shown in FIG. 2 is generally classified as the heat transferring method. It is difficult to apply this method directly as it is in the case where neither the binder used in the magnetic layer 3 nor the substrate 1 is made of a thermoplastic material, that is, in the case where both the binder and the substrate are made for example of a phenolic resin or epoxy resin. In such a case or in the case where an increased bonding strength is desired, the magnetic layer 3 is bonded to the substrate 1 in the same manner as is described above over a film or a coating of a thermoplastic resin, such as vinyl chloride/vinyl acetate copolymer having a thickness of about 2–20 μm. Alternatively, the magnetic layer 3 may be bonded to the substrate 1 over an ordinary adhesive layer comprising a solvent-sensitive adhesive, pressure-sensitive adhesive or reaction-sensitive adhesive. The magnetic recording structure thus obtained shows a laminar structure comprising an adhesive layer 7 including a film of a thermoplastic resin as illustrated in FIG. 3.

For the planar support 6 to be employed in the above process any material having a releasability with respect to the binder of the color layer 5 may be used. A preferred example of a plastic material for use in the case where an acrylic resin is, for example, used in the color layer 5 as a principal constituent of the binder is a film of polyethylene terephthalate which has a releasability with respect to the acrylic resin. If desired, the color layer 5 is applied after one surface of the planar support 6 has been coated with a mold releasing agent.

Figure 4:
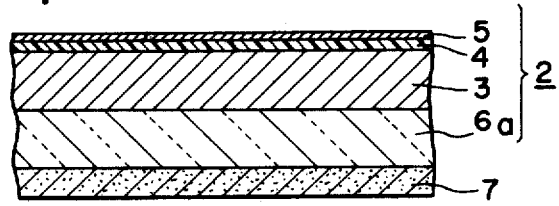
Figure 5:
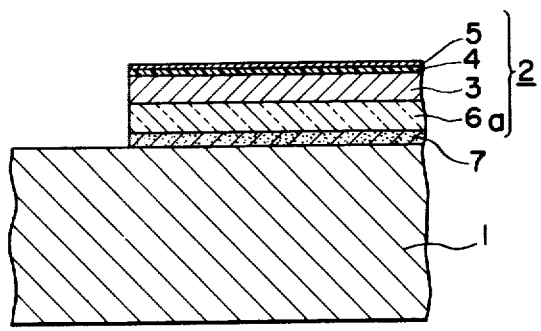

According to a second process for producing the magnetic recording structure of the present invention, the magnetic layer 3, the non-magnetic metal deposition layer 4 and the color layer 5 are formed in sequence by coating or vacuum deposition on one surface of the planar support 6a as shown in FIG. 4 to prepare the magnetic recording piece 2. On the other surface of the planar support 6a there is provided by coating or application under heat and pressure a layer 7 of an adhesive including a solvent-sensitive adhesive, pressure-sensitive adhesive, reaction-sensitive adhesive or temperature-sensitive adhesive, or further an adhesive of thermoplastic nature such as a film or a coating of a thermoplastic resin. Over this adhesive layer the magnetic recording piece 2 is bonded to the substrate 1, whereby the magnetic recording structure shown in FIG. 5 is obtained.

This process is mostly employed when the magnetic recording piece is bonded to the substrate under conditions of relatively low temperature and pressure in the presence of an adhesive other than the above-mentioned thermoplastic adhesives. If desired, the structure illustrated in FIG. 4 may further be provided with a releasing paper (not shown) on the adhesive layer 7 for adequate protection or for convenience in handling until application thereof to the substate.

Even when thermoplastic adhesives are used, however, it is possible to apply the heat transferring method used in the first process set forth above without effecting the removal by peeling-off of the planar support.

For the planar support 6a to be used in this process, any sheet material to which the magnetic layer 3 can be applied, such as a plastic sheet, paper or a non-magnetic metal sheet having a thickness of, for example, about 5-100 μm, may be utilized. An example of such a material for use in the case where the magnetic layer 3 comprises a vinyl chloride/vinyl acetate copolymer as a binder and magnetic iron oxide powder is a polyethylene terephthalate sheet the surface of which has been activated by corona discharge or another known surface-activating treatment.

Figure 6B:
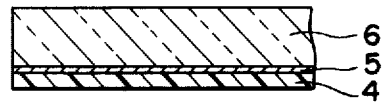
Figure 6A:
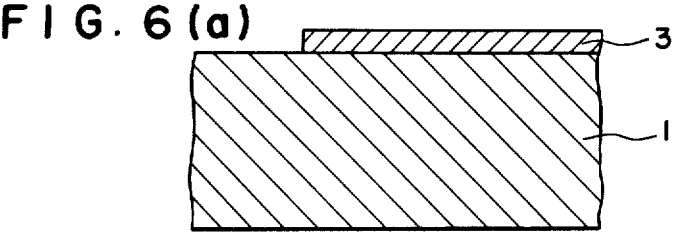
Figure 7:
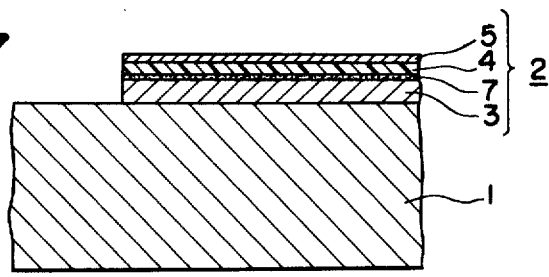

Next, a third process which may be regarded as a modification of the first process will be described. As shown in FIG. 6(a), the magnetic layer 3 is disposed in a desired portion of the substrate 1 by, for example, coating to form the first structure. Then, the color layer 5 and the non-magnetic metal deposition layer 4 are disposed on one surface of the planar support 6 as shown in FIG. 6(b) by coating and vacuum deposition, respectively, to obtain the second structure. The second structure is bonded to the magnetic layer in the first structure, if desired, over an adhesive layer 7, and/or under heat and pressure. The planar support 6 is peeled off after these two structures have been bonded to each other, whereupon the magnetic recording structure shown in FIG. 1 or FIG. 7 is obtained.

Figure 8:
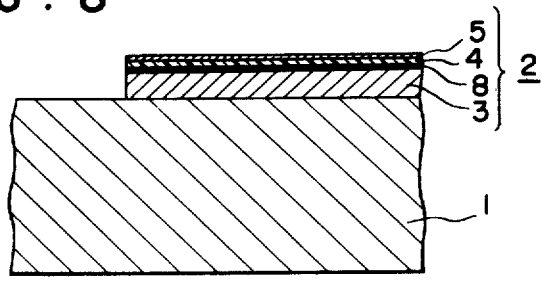

In any of the foregoing processes, an anchor coat layer consisting, for example of a layer of an unsaturated polyester resin or a mixture of melamine resin and an unsaturated polyester resin of about 0.5 μm thickness may be interposed between the non-magnetic metal deposition layer 4 and the layers adjacent thereto such as the color layer 5 and the magnetic layer 3, whereby the bonding strength between the non-magnetic metal deposition layer 4 and the other layers adjacent thereto can be increased. FIG. 8 illustrates an example of a magnetic recording structure wherein an anchor coat layer 8 is interposed between the magnetic layer 3 and the nonmagnetic metal deposition layer 4.

Figure 9:
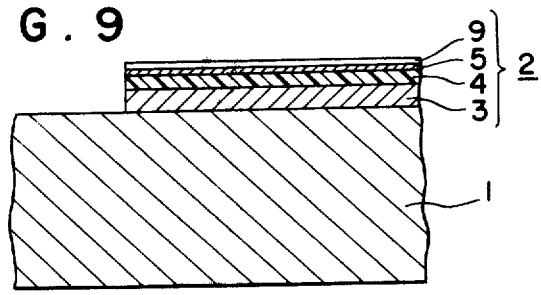
Figure 10:
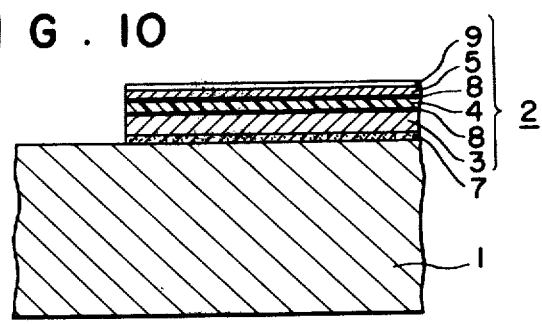

Further, in order to protect the color layer 5 thereby to obtain increased wear resistance and durability, an over print resin layer consisting of any natural or synthetic resin, such as a coating of an acrylic resin or a mixture of melamine resin and an unsaturated polyester resin of a thickness of about 0.5 to 3 μm, preferably 0.5 to 1 μm, may be applied on the color layer. FIG. 9 shows an example of a magnetic recording structure having such an over print layer 9, and FIG. 10 illustrates an example of a magnetic recording structure having an over print layer 9, two anchor coat layers 8 respectively disposed on and beneath the non-magnetic metal deposition layer 4, and an adhesive layer 7 disposed between the magnetic layer 3 and the substrate 1.

Figure 11:
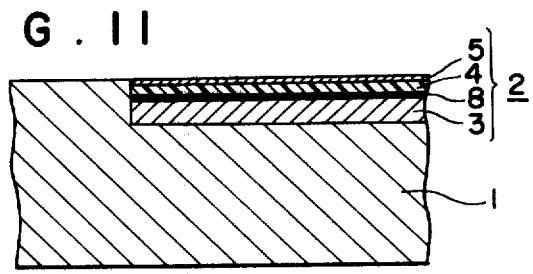

In the case where the magnetic recording piece 2 is bonded to the substrate 1 consisting of a thermoplastic resin at a temperature not lower than the softening temperature of the resin under pressure according to any one of the processes described hereinabove, the magnetic recording piece can be embedded in the substrate, whereby the surfaces of the magnetic recording piece and the substrate lie in the same plane. This is desirable for the purpose of decreasing the wear of the magnetic head and the magnetic recording piece. FIG. 11 shows one example of a magentic recording structure wherein the magnetic recording piece 2 is thus embedded in the substrate 1.

Magnetic cards, ledgers and bankbooks obtained in accordance with the present invention by providing plastic cards, ledgers and bankbooks with a strip of magnetic recording piece were examined by a commercially available magnetic recording apparatus with respect to the electromagnetic conversion characteristic.

As a result, the magnetic read-out output of a strip of magnetic recording piece having an additional layer of 1.5 μm thickness consisting of an aluminum deposition layer and a color layer showed substantially no decrease in comparison with that of a strip of magnetic recording piece having no additional layer when the recording density was 420 FCI.

In view of the fact that even a strip of magnetic recording piece having an additional layer of 2.5 μm thickness showed only 5% or less decrease in read-out output, it has been found that the presence of such an additional layer does not substantially affect the read-out output of the magnetic recording piece.

The color layer in a conventional colored magnetic sheet, though colored with white pigment having high hiding power such as titanium dioxide, cannot completely hide the color of a magnetic layer as long as the thickness of the color layer is of the order of 1.5 to 2.5 μm.

In contrast, it is possible according to the present invention to use an extremely thin color layer due to the interposition of a non-magnetic metal deposition layer and yet obtain a beautiful color tone.

Even in the case of a multilayer structure as shown in FIG. 10, the total thickness of the layers disposed on the magnetic layer can be 4.5 μm or less, and ordinarily ranges from 1 to 5 μm are used in the magnetic recording structure of the present invention. Thus, the thickness of the color layer can be controlled to be far smaller than the 10 μm required for a prior art magnetic recording structure to hide the color of the magnetic material under a pigment of a desired color, and the decrease in magnetic output due to coloration is reduced.

As set forth in detail hereinabove, it is possible according to the present invention, which affords a magnetic recording piece wherein the color of a magnetic material is effectively hidden under a thin layer, to provide magnetic recording structures, such as magnetic cards, bankbooks or ledgers, in beautiful colors without causing a decrease in magnetic output due to gap loss.

The present invention will now be described in more detail with reference to the following examples.

EXAMPLE 1

A planar support consisting of a polyethylene terephthalate film of about 25-μm thickness was coated by the gravure coating method with a color ink comprising a binder containing as a principal constituent a maleic acid resin and a pigment of a desired hue dispersed therein to form a color layer of 1.5-μm thickness. On this color layer, an aluminum deposition layer of about 0.5-μm thickness was formed by vacuum deposition.

Subsequently, an anchor coating agent consisting of an unsaturated polyester resin was applied to the aluminum deposition layer by the gravure coating method in order to increase the bonding strength between the aluminum deposition layer and a magnetic layer, whereby an anchor coat layer of 0.5-μm thickness was obtained. To the anchor coat layer thus obtained a magnetic paint comprising a binder containing as a principal constituent a vinyl chloride/vinyl acetate copolymer resin and magnetic iron oxide powder dispersed therein was applied by the roller coating method to form a magnetic layer of about 15-μm thickness. Thus, a colored magnetic sheet suitable for transferring was obtained.

A colored magnetic recording piece of this magnetic sheet was heat-transferred to a plastic card under the conditions of 150° C., 25 Kg/cm² and 20 min., and the planar support was peeled off therefrom, whereupon a beautiful magnetic card provided with a strip of colored magnetic recording piece was obtained.

The total thickness of the color layer, the aluminum deposition layer and the anchor coat layer in the colored magnetic recording piece of this magnetic card was 2.05 μm, which is one fifth of the thickness of a color layer in a prior art colored magnetic recording piece. The color of the magnetic layer was completely hidden under the color layer.

Further, this magnetic card was examined with respect to the read-out output and found to show substantially no decrease in output due to the additional layers provided therein.

EXAMPLE 2

The upper surface of a planar support consisting of a polyethylene terephthalate film of about 38-μm thickness having a surface which had been activated by corona discharge was coated by the roller coating method with a magnetic paint comprising a binder containing as a principal constituent a vinyl chloride/vinyl acetate copolymer resin and magnetic iron oxide powder dispersed therein to form a magnetic layer of about 15-μm thickness. On the surface of this magnetic layer, an aluminum deposition layer of about 0.05-μm thickness was formed by vacuum deposition. To the aluminum deposition layer thus formed, a color ink comprising a binder containing as a principal constituent a polyamide resin and a pigment of a desired color dispersed therein was applied by the gravure coating method to form a color layer of 1.5-μm thickness. The lower surface of the planar support was coated with an adhesive comprising essentially an acrylic resin to form an adhesive layer of 20 μm in thickness. Thus, a colored magnetic sheet was obtained.

The adhesive layer of this magnetic sheet was bonded to the cover of a bankbook, whereby a magnetic bankbook of pleasant appearance provided with a strip of colored magnetic recording piece was obtained.

The total thickness of the color layer and the aluminum deposition layer in the colored magnetic recording piece of this magnetic bankbook was 1.55 μm, which is less than one fifth of the thickness of a color layer in a prior art colored magnetic recording piece, and the color of the magnetic layer was completely hidden under the color layer.

Further, this magnetic bankbook was tested with respect to the read-out output and found to show substantially no decrease in output due to the additional layers provided thereon.

What is claimed is:

1. A decoratively colored magnetic recording card, bankbook, or ledger including a substrate of a paper or a plastic sheet having an outer surface and a laminar magnetic recording piece disposed adjacent to at least one part of the outer surface of the substrate, said recording piece having a dark-colored magnetic layer for storing magnetically recorded information for subsequent readout, the improvement wherein the laminar magnetic recording piece further comprises:

a nonmetallic decorative color layer comprising an ink containing a pigment or a dye and a binder principally composed of a natural or synthetic resin and a non-magnetic light-colored metal deposition layer interposed between the magnetic layer and the nonmetallic color layer, said magnetic layer being closer to the substrate than the color layer, the non-magnetic metal deposition layer having a thickness between about 0.02 micron and about 0.1 micron sufficient to hide the color of the magnetic layer, and the combined thickness of the non-magnetic metal layer and the decorative color layer being less than the thickness of the decorative color layer alone that would be required to hide the color of the magnetic layer, whereby a decorative color layer is provided without impairing the readout characteristics of the magnetic recording structure.

2. A magnetic recording structure as claimed in claim 1 wherein the magnetic recording piece further comprises a planar support layer interposed between the magnetic layer and the substrate.

3. A magnetic recording structure as claimed in claim 1 wherein the magnetic recording piece is heat bonded directly onto the substrate.

4. A magnetic recording structure as claimed in claim 1 wherein the magnetic recording piece is bonded onto the substrate over an adhesive layer interposed therebetween.

5. A magnetic recording structure as claimed in claim 1 wherein the magnetic recording piece further comprises an over print resin layer on the color layer.

6. A magnetic recording structure as claimed in claim 1 wherein an anchor layer is interposed between the color layer and the non-magnetic metal deposition layer.

7. A magnetic recording structure as claimed in claim 1 wherein an anchor layer is interposed between the non-magnetic metal deposition layer and the magnetic layer.

8. A magnetic recording structure as claimed in claim 1 wherein the non-magnetic metal is a metal selected from the group consisting of aluminum, tin, gold and silver.

9. A magnetic recording structure as claimed in claim 1 wherein the layers disposed on the magnetic layer including the color layer and the non-magnetic metal layer have a thickness of about 1 to 5 μm.

10. A magnetic recording structure as claimed in claim 1 wherein the magnetic recording piece is embedded in a part of the substrate and the surface of the magnetic recording piece thus embedded lies in the same plane as the surface of the remaining parts of the substrate.

11. A magnetic recording structure according to claim 1 wherein the thickness of the non-magnetic metal deposition layer is between 0.03 and 0.08 micron.

12. A magnetic recording structure according to claim 1 wherein the thickness of the nonmetallic color layer is about 1 to 2 microns.

13. A magnetic recording structure according to claim 1 wherein the thickness of the nonmetallic color layer is about 1.5 micron.

* * * * *